Patented May 13, 1952

2,596,107

UNITED STATES PATENT OFFICE 2,596,107

USE OF CARBALKOXY HYDROXY BENZO-COUMARIN AGAINST FUNGI

Milton Silverman, Forest Hills, and Bernard Heinemann, De Witt, N. Y., assignors to Schieffelin & Co., New York, N. Y., a corporation of New York No Drawing. Application December 4, 1948, Serial No. 63,608

8 Claims. (Cl. 167—33)

This invention relates to a method of controlling or inhibiting the growth of fungi by treating them with an agent selected from the class consisting of 3-carbalkoxy-4-hydroxybenzocoumarin and 3-carbalkoxy-4-hydroxy-hydrobenzocoumarin. The invention also relates to new compounds that are useful in this method.

Effective compounds within the foregoing definition are 3-carbalkoxy-4-hydroxy-7,8-benzocoumarin, 3-carbalkoxy-4-hydroxy-6,7-benzocoumarin, and 3-carbalkoxy-4-hydroxy-5,6-benzocoumarin, the latter two of which may be represented as follows:

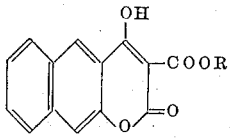

3-carbalkoxy-4-hydroxy-6,7-benzocoumarin

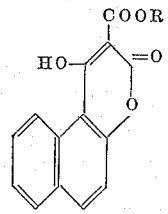

3-carbalkoxy-4-hydroxy-5,6-benzocoumarin

When the left hand ring of these three-ring compounds is hydrogenated either partially or completely, preferably the latter, other useful compounds may be obtained, such as 3-carbalkoxy - 4 - hydroxy-6,7 - tetrahydrobenzocoumarin and 3-carbalkoxy-4-hydroxy-5,6-tetrahydrobenzocoumarin, which are new. The alkoxy group in these compounds may be methoxy, ethoxy, propoxy, etc.

The invention is particularly applicable in controlling those fungus infections which in humans are commonly called ringworm of the scalp or skin.

The above described compounds may be applied directly to humans and other animals, and to plants, fabrics, and organic materials in general by means of a solution of the compound or a liquid carrier therefor, or the compound may be in powder or other solid form.

As illustrative of the applicability of the invention, 3-carbethoxy-4-hydroxy-6,7-benzocoumarin, 3-carbethoxy-4-hydroxy-6,7-tetrahydrobenzocoumarin, 3-carbethoxy-4-hydroxy-5,6-benzocoumarin, 3-carbethoxy-4-hydroxy-5,6-tetrahydrobenzocoumarin, and 3-carbethoxy-4-hydroxy-7,8-benzocoumarin were tested by the method of Schomberg and Kolmer, Arch. Derm. and Syph., Vol. 6, p. 746 (1922), as modified by Keeney, Bull. John Hopkins Hospital, p. 420, Nov. 1943–Dec. 1944, and found to be effective for inhibiting the growth of gungus, T. interdigitale. Other fungi like M. audiouini, S. schenkii, T. purpureum, T. gypsum, A. schoeleini, M. lanosum, etc. may also be controlled by means of these compounds.

The following examples illustrate the preparation of 3-carbethoxy-4-hydroxy-6,7-tetrahydrobenzocoumarin and 3-carbethoxy-4-hydroxy-5,6-tetrahydrobenzocoumarin, respectively.

Example 1

Ten g. of 3-acetoxy-2-naphthoic acid was covered with 25 cc. of chloroform in a flask and 9.5 g. of phosphorous pentachloride added. The mixture was refluxed for thirty minutes and the chloroform then removed under reduced pressure. The residue was treated with 100 cc. of ligroin and the mixture cooled. The resulting precipitate was collected, washed with ligroin, and then dissolved in 25 cc. of benzene. It consisted of crude 3-acetoxy-2-naphthoyl chloride.

In a flask equipped with a mercury sealed stirrer, condenser and addition funnel were placed 2.1 g. magnesium, 0.5 cc. of carbon tetrachloride, and 6 cc. of absolute alcohol. Provision was made for cooling the flask when necessary and the mixture was gently heated to start the reaction. After the initial violence had subsided, 14 cc. of diethyl malonate were added at such a rate that the reaction proceeded vigorously but not beyond control. When the last of the malonic ester had been added, 10 cc. of dry benzene were quickly poured into the flask and refluxing and stirring continued for 1–2 hours. The reaction was complete when no more hydrogen evolved. The mixture was then diluted with 75 cc. of dry benzene. It consisted of diethyl ethoxylmagnesium malonate.

The benzene solution of crude 3-acetoxy-2-naphthoyl chloride was then added dropwise through the addition funnel to the reaction mixture containing the diethyl ethoxylmagnesium malonate. The addition was made at such a rate that refluxing conditions were maintained. Towards the end of the reaction the magnesium-containing product separated as a viscous mass. The reaction was complete after heating and stirring for ½ hr. on the steam bath. The benzene was then removed under reduced pressure, and the residual gum decomposed with warm dilute sulfuric acid (20%). The solid was collected, washed with water, and recrystallized from glacial acetic acid. It consisted of 3-carbethoxy-4-hydroxy-6,7-benzocoumarin. M. P. 175–177° C.

One g. of 3-carbethoxy-4-hydroxy-6,7-benzocoumarin was reduced by dissolving it in 50 cc. of warm glacial acetic acid and placing the solution in an Adams shaker, using platinum oxide as catalyst and a hydrogen pressure of 3 atm. The theoretical amount of hydrogen was taken up in 2–3 hrs. The catalyst was filtered off and the filtrate diluted with 4–5 vols. of water. After cooling, the crystalline material was collected, washed with water and crystallized from alcohol. It consisted of 3-carbethoxy-4-hydroxy-6,7-tetrahydrobenzocoumarin, melting at 124–125.5° C.

Instead of starting with 3-acetoxy-2-naphthoic acid in the above example, one may start with the tetrahydro compound: 3-acetoxy-5,6,7,8-tetrahydro-2-naphthoic acid, or a less hydrogenated acid, and in this event the final hydrogenation step is omitted. Products of varying degree of hydrogenation may thus be obtained.

*Example 2*

Five g. of 2-hydroxy-1-naphthoic acid was refluxed in a flask with 15 cc. of thionyl chloride and 2 drops of pyridine for 20 minutes. The thionyl chloride was distilled under reduced pressure, and the residue treated with 25 cc. of benzene, which later was also removed. This addition of benzene and its removal was repeated twice more. The material in the flask was then taken up in 25 cc. of dry toluene. The resulting mixture was added dropwise to a refluxing solution of sodium malonic ester in toluene, prepared from 13 cc. of diethyl malonate and 1.86 g. of sodium in the usual manner. The sodium salt of the desired compound was filtered off after refluxing the reaction mixture for 4 hours. The solid was washed with ether and then dissolved in hot dilute alcohol (1:1). The solution was filtered, cooled, and acidified with dilute hydrochloric acid. The solid was collected, washed with water and crystallized from alcohol. It consisted of 3-carbethoxy-4-hydroxy-5,6-benzocoumarin, melting at 155–157° C. The latter compound was reduced in the Adams shaker in the same way as the reduction described in Example 1. The resulting product was 3-carbethoxy-4-hydroxy-5,6-tetrahydrobenzocoumarin, melting at 139–141° C. after recrystallization from alcohol.

2-hydroxy-5,6,7,8-tetrahydro-1-napthoic acid, or a less hydrogenated acid, may replace the 2-hydroxy-1-naphthoic acid in Example 2, and the final hydrogenation step omitted.

As will be seen, the preparative method in the foregoing examples involves a reaction between an acyloxy- or hydroxy-substituted naphthoyl halide and a sodium or magnesium malonic ester, followed, if necessary, depending upon the degree of hydrogenation of the naphthoyl halide, by a reduction of the resulting benzocoumarin product.

In the light of the foregoing description, the following is claimed:

1. Method of inhibiting the growth of fungi by treating them with 3-carbalkoxy-4-hydroxy-benzocoumarin.
2. Method of inhibiting the growth of fungi by treating them with 3-carbethoxy-4-hydroxy-benzocoumarin.
3. Method of inhibiting the growth of fungi by treating them with 3-carbalkoxy-4-hydroxy-5,6-benzocoumarin.
4. Method of inhibiting the growth of fungi by treating them with 3-carbethoxy-4-hydroxy-5,6-benzocoumarin.
5. Method of inhibiting the growth of fungi by treating them with 3-carbethoxy-4-hydroxy-6,7-benzocoumarin.
6. Method for inhibiting the growth of fungi by treating them with 3-carbalkoxy-4-hydroxy-6,7-benzocoumarin.
7. Method for inhibiting the growth of fungi by treating them with 3-carbalkoxy-4-hydroxy-7,8-benzocoumarin.
8. Method for inhibiting the growth of fungi by treating them with 3-carbethoxy-4-hydroxy-7,8-benzocoumarin.

MILTON SILVERMAN.
BERNARD HEINEMANN.

REFERENCES CITED

The following references are of record in the file of this patent:

UNITED STATES PATENTS

| Number | Name | Date |
|---|---|---|
| 2,127,879 | Martin | Aug. 23, 1938 |
| 2,418,459 | Bousquet | Apr. 8, 1947 |

OTHER REFERENCES

Geiger et al.: J. Am. Chem. Soc., Jan. 1945, vol. 67, pp. 112–116, 167–65.

Oster et al.: American Journal of Pharmacy, October 1949, pp. 375–389, 167–58R.

Kligman: The Journal of Investigative Dermatology, February 1948, pages 59–62, 67, 167/58r.

Lauger: Helvetia Chimica Acta, vol. 27, June 15, 1944, pages 896–899, 167/22.